(12) United States Patent
Nishimura

(10) Patent No.: US 11,438,473 B2
(45) Date of Patent: Sep. 6, 2022

(54) MEDIUM-DISCHARGING DEVICE AND IMAGE READING APPARATUS

(71) Applicant: SEIKO EPSON CORPORATION, Tokyo (JP)

(72) Inventor: Yoichiro Nishimura, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/305,338

(22) Filed: Jul. 6, 2021

(65) Prior Publication Data

US 2022/0006913 A1 Jan. 6, 2022

(30) Foreign Application Priority Data

Jul. 6, 2020 (JP) .............................. JP2020-116473

(51) Int. Cl.
*H04N 1/04* (2006.01)
*H04N 1/00* (2006.01)

(52) U.S. Cl.
CPC ..... *H04N 1/00525* (2013.01); *H04N 1/00559* (2013.01); *H04N 1/00631* (2013.01)

(58) Field of Classification Search
CPC ........................ H04N 1/00525; H04N 1/00559
USPC .................................................. 358/498, 496
See application file for complete search history.

(56) References Cited

U.S. PATENT DOCUMENTS

| 2001/0009625 | A1 | 7/2001 | Tamehira et al. |
| 2005/0236764 | A1* | 10/2005 | Saeki ..................... B65H 31/10 271/293 |
| 2012/0049441 | A1* | 3/2012 | Kimura ................. B65H 33/08 271/223 |

FOREIGN PATENT DOCUMENTS

| JP | 2001-328758 | | 11/2001 |
| JP | 2011251786 A | * | 12/2011 |
| JP | 2014-231398 A | | 12/2014 |
| JP | 2020-075790 A | | 5/2020 |

* cited by examiner

*Primary Examiner* — Cheukfan Lee
(74) *Attorney, Agent, or Firm* — Workman Nydegger

(57) ABSTRACT

A medium-discharging device includes: a device main body including a medium-discharging section that discharges a medium; a medium-receiving tray that receives the medium discharged by the medium-discharging section; and a pressing member that is configured to be attached to and detached from to the device main body and presses the medium discharged by the medium-discharging section against the medium-receiving tray in a state in which the pressing member is attached to the device main body, in which the pressing member is configured to switch, in the state in which the pressing member is attached to the device main body, between a first state in which the pressing member comes into contact with the medium-receiving tray and a second state in which the pressing member retreats upward so as to be apart from the medium-receiving tray.

17 Claims, 16 Drawing Sheets

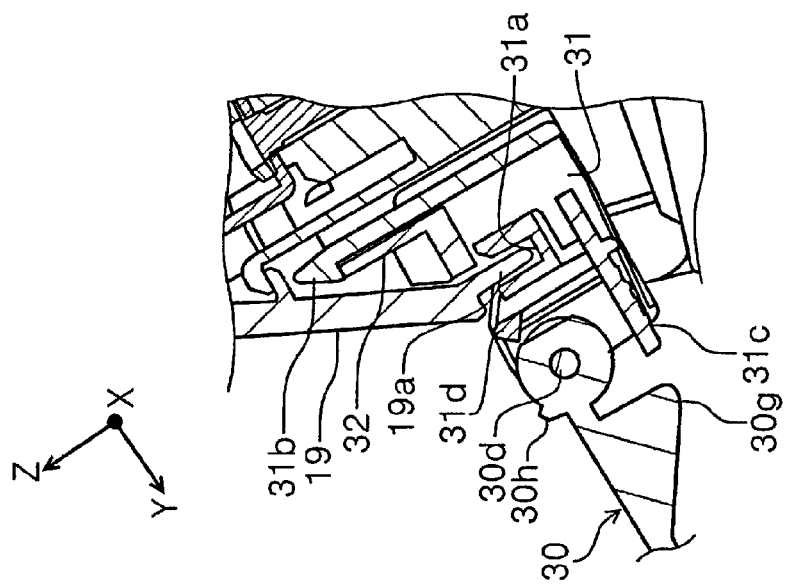
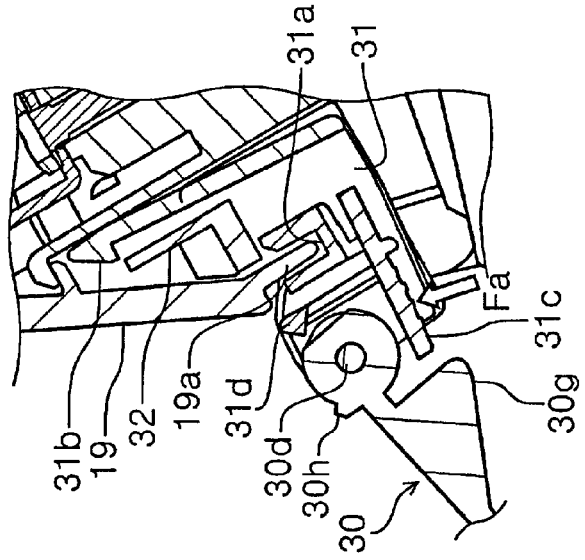
FIG. 11A
FIG. 11B

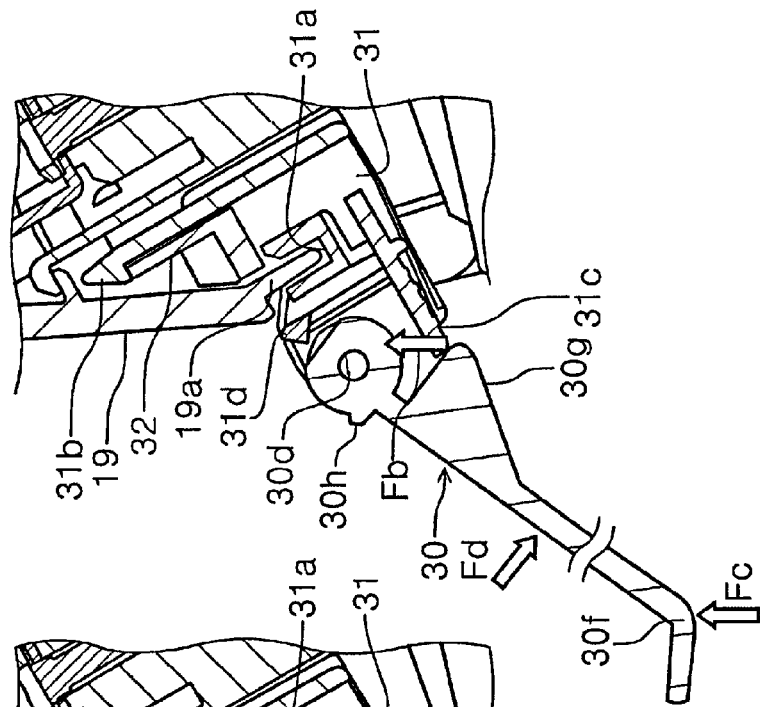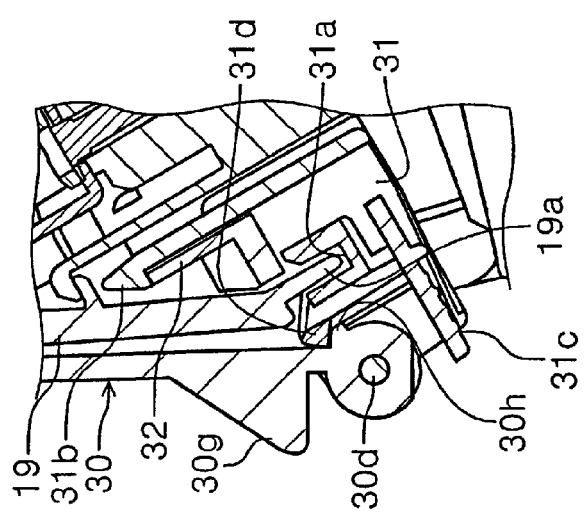

MEDIUM-DISCHARGING DEVICE AND IMAGE READING APPARATUS

The present application is based on, and claims priority from JP Application Serial Number 2020-116473, filed Jul. 6, 2020, the disclosure of which is hereby incorporated by reference herein in its entirety.

BACKGROUND

1. Technical Field

The present disclosure relates to a medium-discharging device that discharges a medium and an image reading apparatus including the medium-discharging device.

2. Related Art

For example, some document scanners that read a document while transporting the document and some printers that perform recording on a sheet include a tray for receiving a discharged medium and a pressing member for pressing the medium discharged to the tray as described in JP-A-2014-231398. Since the discharged medium is pressed down by the pressing member, the media accumulate on the tray in an appropriate state, even when the media are strongly curled.

In the configuration described in JP-A-2014-231398, the pressing member is configured to be detachably attached. When the pressing member is detachably attached as described above, it is possible to avoid breakage of the pressing member during storage or transportation of the device, but, on the other hand, management of the detached pressing member is problematic in a typical use environment.

SUMMARY

A medium-discharging device of the present disclosure to solve the aforementioned problem includes: a device main body including a medium-discharging section that discharges a medium; a medium-receiving tray that receives the medium discharged by the medium-discharging section; and a pressing member that is configured to be attached to and detached from the device main body and press the medium discharged by the medium-discharging section against the medium-receiving tray in a state in which the pressing member is attached to the device main body, in which the pressing member is configured to switch, in the state in which the pressing member is attached to the device main body, between a first state in which the pressing member comes into contact with the medium discharged by the medium-discharging section and a second state in which the pressing member retreats upward to a position at which the pressing member does not come into contact with the medium discharged by the medium-discharging section.

BRIEF DESCRIPTION OF THE DRAWINGS

FIGS. 11A and 11B are each a sectional view of the pressing member, the pedestal section, and a fixation section.
FIGS. 12A to 12C are each a sectional view of the pressing member, the pedestal section, and the fixation section.

DESCRIPTION OF EXEMPLARY EMBODIMENTS

Figure 1:
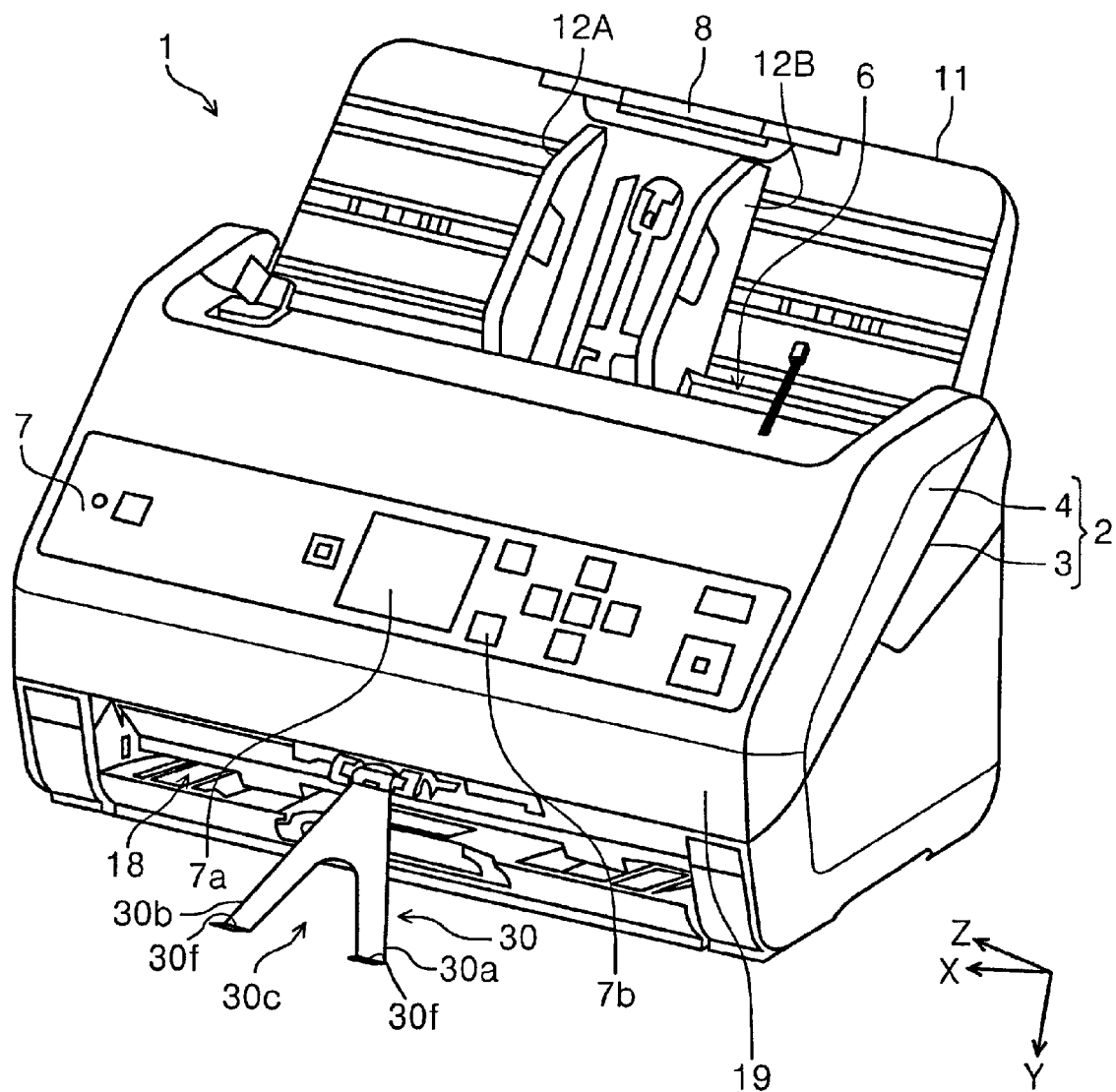
FIG. 1 is a perspective view of an exterior of a scanner.

The disclosure will be schematically described below.

A medium-discharging device according to a first aspect includes: a device main body including a medium-discharging section that discharges a medium; a medium-receiving tray that receives the medium discharged by the medium-discharging section; and a pressing member that is configured to be attached to and detached from the device main body and presses the medium discharged by the medium-discharging section against the medium-receiving tray in a state in which the pressing member is attached to the device main body, in which the pressing member is configured to switch, in the state in which the pressing member is attached to the device main body, between a first state in which the pressing member comes into contact with the medium discharged by the medium-discharging section and a second state in which the pressing member retreats upward to a position at which the pressing member does not come into contact with the medium discharged by the medium-discharging section.

According to the present aspect, since the pressing member is configured to be detachably attached to the device main body and is configured to switch, in the state of being attached to the device main body, between the first state in which the pressing member comes into contact with the medium discharged by the medium-discharging section and the second state in which the pressing member retreats upward to the position at which the pressing member does not come into contact with the medium discharged by the medium-discharging section, when the pressing member is not necessary in a typical use environment, the pressing member may be brought into the second state without being detached from the device main body, and it is thereby possible to meet user demand, thus making it possible to enhance user convenience.

The medium-discharging device according to a second aspect further includes, in the first aspect, a load applying unit that applies a load to the pressing member in an operation of switching from the second state to the first state.

According to the present aspect, since the load applying unit that applies a load to the pressing member in the operation of switching from the second state to the first state is further included, it is possible to suppress the pressing member from switching from the second state to the first state against an intention of a user, thus making it possible to further enhance user convenience.

According to a third aspect, in the first or second aspect, the pressing member is provided so as to switch between the first state and the second state by rotating, and the pressing member rotates to be in the second state, when an external force including a vertically upward component is applied to a tip end of the pressing member positioned at a lower-rotation limit.

In a case in which the device main body is lifted for moving, there is a possibility that, when the device main body is placed, the pressing member positioned at the lower-rotation limit comes into contact with an installation surface of the device, resulting in breakage of the pressing member. However, according to the present aspect, when the external force including the vertically upward component is applied to the tip end of the pressing member positioned at the lower-rotation limit, the pressing member rotates to be in the second state, and it is thereby possible to suppress breakage of the pressing member as described above.

According to a fourth aspect further includes, in the third aspect: an abutting section that is formed at the pressing member; and a regulating section that comes into contact with the abutting section and regulates a rotation of the pressing member. The pressing member at the lower-rotation limit is regulated and inclined obliquely downward when the abutting section comes into contact with the regulating section.

According to the present aspect, since the lower-rotation limit of the pressing member is regulated when the abutting section formed at the pressing member abuts the regulating section, and the orientation of the pressing member is inclined obliquely downward in the state in which the abutting section abuts the regulating section, when the external force including the vertically upward component acts on a lower edge of the pressing member positioned at the lower-rotation limit, the pressing member is able to reliably rotate to be in the second state, and it is possible to reliably suppress breakage of the pressing member described above.

The medium-discharging device according to a fifth aspect further includes, in the first or second aspect: a lock section that fixes the pressing member to the device main body; and an operation section that is configured to unlock a lock of the lock section, in which the pressing member is provided so as to switch between the first state and the second state by rotating, and when an external force that causes the pressing member to rotate in a direction in which the member rotates from the first state to the second state is applied to the pressing member positioned at the lower-rotation limit, a portion of the pressing member abuts against the operation section and the lock of the lock section is unlocked.

When the external force which causes the pressing member to rotate in the direction opposite to the direction in which the pressing member is brought into the second state is applied to the pressing member positioned at the lower-rotation limit, there is a possibility of causing breakage of the pressing member. However, according to the present aspect, when the external force which causes the pressing member to rotate in the direction opposite to the direction in which the pressing member is brought into the second state is applied to the pressing member positioned at the lower-rotation limit, since a portion of the pressing member abuts the operation section, and the fixation of the pressing member which is performed by the lock section is terminated, the pressing member is able to detach and drop, thus making it possible to suppress breakage of the pressing member.

According to a sixth aspect, in any of the first to fifth aspects, a contact position at which the medium discharged by the medium-discharging section comes into contact with the pressing member in the first state is further downstream in a discharging direction than a position at which the medium discharged by the medium-discharging section comes into contact with the medium-receiving tray.

When the medium discharged by the medium-discharging section comes into contact with the pressing member before coming into contact with the medium-receiving tray or a medium loaded on the medium-receiving tray, there is a possibility of the medium deforming and causing a jam. However, according to the present aspect, since the contact position at which the medium discharged by the medium-discharging section comes into contact with the pressing member is further downstream in the discharging direction than the position at which the medium discharged by the medium-discharging section comes into contact with the medium-receiving tray or a medium loaded on the medium-receiving tray, it is possible to suppress jamming, as described above, from occurring.

According to a seventh aspect, in any of the first to sixth aspects, the pressing member has at least two contact portions that come into contact with the medium in a width direction which is a direction intersecting a medium-discharging direction when the pressing member is in the first state.

According to the present aspect, since the pressing member has at least two contact portions that come into contact with the medium in the width direction which is the direction intersecting the medium-discharging direction when the pressing member is in the first state, it is possible to suppress rotation, that is, skewing, of the discharged medium.

According to an eighth aspect, in the first aspect, the pressing member has two contact portions that come into contact with the medium in a width direction which is a direction intersecting a medium-discharging direction when the pressing member is in the first state, and a center position in the width direction of the medium discharged by the medium-discharging section is between the two contact portions.

According to the present aspect, since the medium is pressed by the pressing member on both sides in the width direction with respect to the center position in the width direction, it is possible to more effectively suppress rotation, that is, skewing, of the discharged medium.

According to a ninth aspect, in the eighth aspect, the two contact portions come into contact with the medium at different positions in the width direction, and the pressing member has a shape in which a center section between the two contact portions in the width direction is cut out.

According to the present aspect, since the pressing member expands, downstream in the medium-discharging direction, in the width direction which is the direction intersecting the medium-discharging direction and has the shape in which the center section in the width direction is cut out, by pressing the medium in a region which is wide in the width direction, it is possible to effectively suppress rotation, that is, skewing, of the discharged medium. Moreover, since the pressing member has the shape in which the center section in the width direction is cut out, it is possible to reduce an area of the device main body which is covered by the pressing member when the pressing member switches to the second state and possible to suppress a degradation in operability of the device main body.

According to a tenth aspect, in any of the first to ninth aspects, the pressing member has a protruded portion that comes into contact with the medium-receiving tray and protrudes toward the medium-receiving tray when viewed in the width direction which is the direction intersecting the medium-discharging direction.

In a case in which the medium-receiving tray is configured to be expanded/contracted, particularly when the medium-receiving tray is contracted, there is a possibility of the medium-receiving tray being caught by the pressing member. However, according to the present aspect, since the pressing member has the shape in which the portion that comes into contact with the medium-receiving tray protrudes toward the medium-receiving tray, it is possible to suppress the medium-receiving tray from being caught.

According to an eleventh aspect, in any of the first to tenth aspects, the pressing member is configured to adjust a pressing load with which the pressing member presses the medium.

According to the present aspect, since the pressing member is configured to adjust the pressing load with which the pressing member presses the medium, it is possible to adjust the pressing load in accordance with a size, a type, or the like of the medium, thus making it possible to appropriately press the medium.

According to a twelfth aspect, in any of the first to eleventh aspects, the pressing member is configured to adjust a dimension of the pressing member in the medium-discharging direction.

According to the present aspect, since the pressing member is configured to adjust the dimension of the pressing member in the medium-discharging direction, it is possible to adjust, in accordance with a size of the medium, a position at which the pressing member presses the medium, thus making it possible to appropriately press the medium.

According to a thirteenth aspect, in any of the first to twelfth aspects, the pressing member is configured to switch a portion which comes into contact with the medium between a first portion in which a frictional coefficient between the first portion and the medium is a first frictional coefficient and a second portion in which a frictional coefficient between the second portion and the medium is a second frictional coefficient which is larger than the first frictional coefficient.

According to the present aspect, since the pressing member is configured to switch the portion which comes into contact with the medium between the first portion in which the frictional coefficient between the first portion and the medium is the first frictional coefficient and the second portion in which the frictional coefficient between the second portion and the medium is the second frictional coefficient which is larger than the first frictional coefficient, it is possible to switch the frictional coefficient in accordance with a size, a type, or the like of the medium, thus making it possible to appropriately press the medium.

According to a fourteenth aspect, in any of the first to thirteenth aspects, the device main body includes a display section displaying various types of information, and, the pressing member in the second state is located at a position at which the pressing member covers a portion of the display section so as not to obstruct viewing of display content on the display section in a planer view.

According to the present aspect, since, in the planer view of the display section, the pressing member in the second state is located at the position at which the pressing member covers a portion of the display section so as not to obstruct viewing of the display content on the display section, it is possible to suppress the pressing member in the second state from obstructing viewing of the display section 7a by a user.

According to a fifteenth aspect, in any of the first to fourteenth aspects, the device main body includes an operation panel that receives various operation settings, the operation panel includes at least one pressing button configured to be pressed, and, the pressing member in the second state is located at a position at which the pressing member covers a portion of the pressing button and the pressing member exposes a portion of the pressing button in a planer view.

According to the present aspect, since, in the planer view of the pressing button, the pressing member in the second state is located at the position at which the pressing member covers a portion of the pressing button and the pressing member exposes a portion of the pressing button, it is possible to avoid a situation in which the pressing member in the second state prevents a user from pressing the pressing button.

An image reading apparatus according to a sixteenth aspect includes: a reading unit that reads the medium; and the medium-discharging device according to any of the first to fifteenth aspects which discharges the medium read by the reading unit.

According to the present aspect, in the image reading apparatus, it is possible to obtain an effect of any of the first to fifteenth aspects described above.

The disclosure will be specifically described below.

As an example of an image reading apparatus, a document scanner 1 capable of reading at least one of a front surface and a rear surface of a document, which is an example of a medium, will be described below. The document scanner 1 will be hereinafter abbreviated as the scanner 1. Moreover, a document will be hereinafter referred to as a document P.

Note that, in the X-Y-Z coordinate system illustrated in each drawing, the X-axis direction indicates an apparatus width direction and a document width direction, and the Y-axis direction indicates a document transport direction when a document is read and a discharging direction when a document is discharged. The Z-axis direction indicates a direction which intersects the Y-axis direction and which is orthogonal to a surface of the document P to be read. Hereinafter, a direction (+Y-axis direction) in which the document P is transported may be referred to as "downstream", and a direction (−Y-axis direction) opposite thereto may be referred to as "upstream".

In FIG. 1, the scanner 1 includes a device main body 2. The device main body 2 is constituted by a lower unit 3 and an upper unit 4. The upper unit 4 is provided so as to be openable/closable with respect to the lower unit 3 with a pivot axis (not illustrated) downstream in the document transport direction as a pivot fulcrum, and the configuration is such that it is possible to handle jamming of the document P by opening the upper unit 4 in a device front direction to expose a document transport path.

On the rear side of the device main body 2, a document mounting section 11 on which the document P to be fed is mounted is provided. The document mounting section 11 is provided so as to be detachably attached to the device main body 2.

Moreover, a pair of edge guides 12A and 12B that guide side edges of the document P in the width direction is provided in the document mounting section 11.

The document mounting section 11 includes a paper support 8. The paper support 8 is configured to be able to be accommodated in the document mounting section 11 and to be able to be drawn out from the document mounting section 11, thus making it possible to adjust a dimension of a document mounting surface.

On the device front side of the upper unit 4, the device main body 2 includes an operation panel 7 for performing various operation settings. In addition to a display section 7a on which various types of information are displayed, a plurality of operation buttons for performing various operation settings are provided on the operation panel 7, and an operation button denoted by reference numeral 7b is one of such operation buttons.

A feed opening 6 that leads to the interior of the device main body 2 is provided in an upper portion of the device main body 2, and the document P mounted on the document mounting section 11 is transported from the feed opening 6 toward a reading section 20 (refer to FIG. 2) provided in the device main body 2.

Next, the document transport path in the scanner 1 will be described with reference to mainly FIG. 2.

Figure 2:
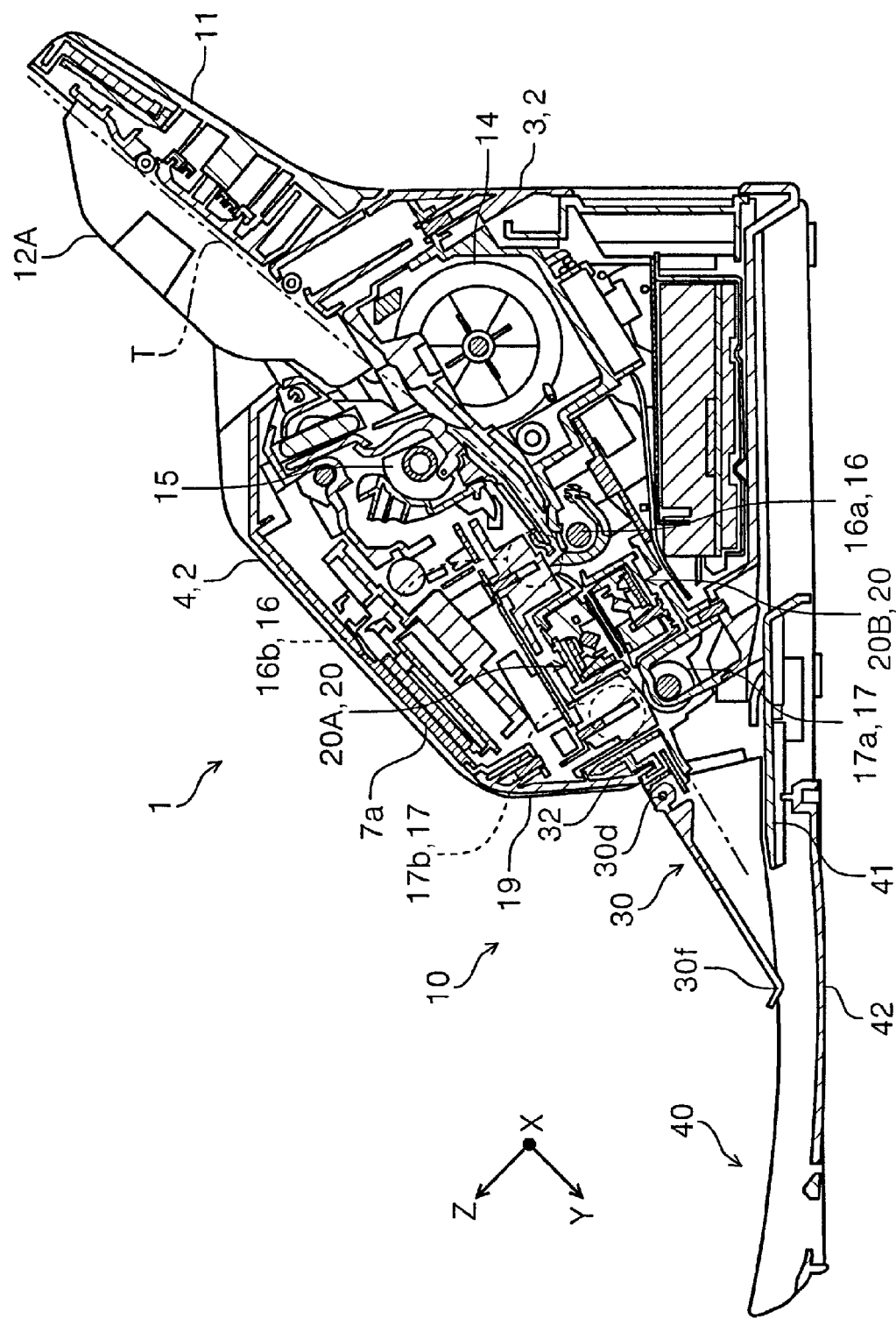
FIG. 2 is a side sectional view illustrating a document transport path in the scanner.

In FIG. 2, a two-dot chain line denoted by reference T indicates the document transport path. The document transport path T is formed by a region between the lower unit 3 and the upper unit 4.

The document mounting section 11 is provided in the most upstream portion of the document transport path T, and a feed roller 14 that transports the document P mounted on the document mounting section 11 toward the reading section 20 and a separation roller 15 that nips the document P between the separation roller 15 and the feed roller 14 and separates the document P are provided downstream of the document mounting section 11.

The feed roller 14 driven by a motor (not illustrated) comes into contact with the lowest document P of the documents P mounted on the document mounting section 11. Thus, when a plurality of documents P are set on the document mounting section 11 of the scanner 1, the documents P are sequentially fed downstream starting with the lowermost one. Torque in a direction for returning the document P to the upstream portion is transferred from a motor (not illustrated) to the separation roller 15 via a torque limiter (not illustrated).

A transporting roller pair 16, the reading section 20 which reads the document P, and a discharge roller pair 17 which constitutes an example of a medium-discharging section are provided downstream of the feed roller 14. The transporting roller pair 16 includes a transporting drive roller 16a that is rotationally driven by a motor (not illustrated) and a transporting driven roller 16b that is driven to rotate.

The document P nipped by the feed roller 14 and the separation roller 15 and fed downstream is nipped by the transporting roller pair 16 and transported to the reading section 20 which is positioned downstream of the transporting roller pair 16.

The reading section 20 includes an upper reading sensor 20A provided in the upper unit 4 and a lower reading sensor 20B provided in the lower unit 3. In the present embodiment, the upper reading sensor 20A and the lower reading sensor 20B each include a contact image sensor module (CISM).

The lower reading sensor 20B reads a lower surface of the document P, and the upper reading sensor 20A reads an upper surface of the document P.

After at least one of the upper surface and the lower surface is read by the reading section 20, the document P is nipped by the discharge roller pair 17 which is positioned downstream of the reading section 20 and discharged toward a document receiving tray 40 which is an example of a medium-receiving tray from a discharge opening 18 provided in the device front surface.

The discharge roller pair 17 includes a discharge drive roller 17a that is rotationally driven by a motor (not illustrated) and a discharge driven roller 17b that is driven to rotate.

The document receiving tray 40 and the device main body 2, which includes a pressing member 30 described below and the discharge roller pair 17, constitute a document discharging device 10 which is an example of a medium-discharging device. Note that, from the viewpoint of discharging the document P which is an example of the medium, it is also possible to consider the entire scanner 1 as an example of the medium-discharging device.

Figure 3:
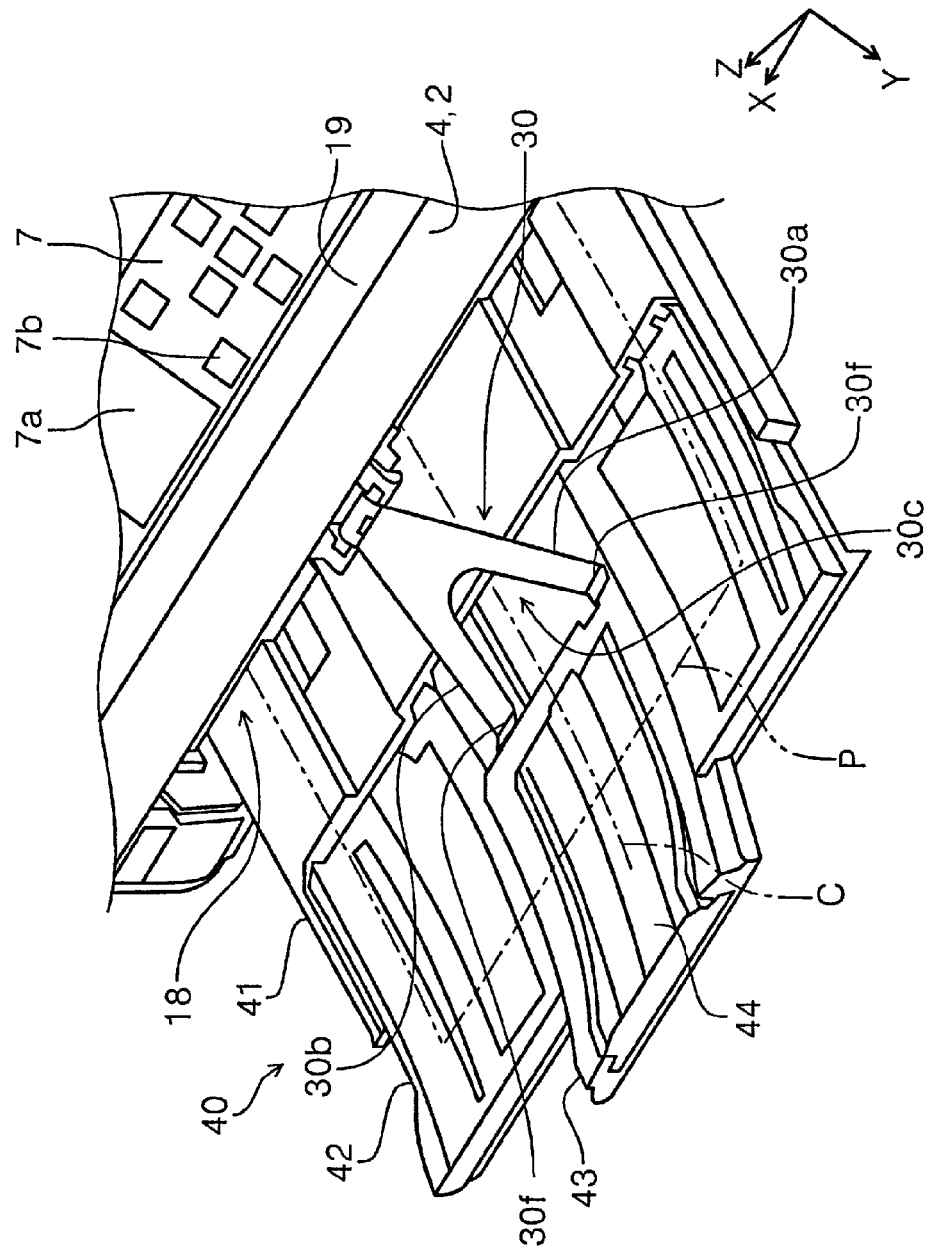
FIG. 3 is a perspective view of a document receiving tray and a pressing member.

The document receiving tray 40 includes a base tray 41, a first expansion tray 42, a second expansion tray 43, and a third expansion tray 44 as illustrated in FIG. 3.

The first expansion tray 42 is held by the base tray 41 and can be in a state of being accommodated in the base tray 41 as illustrated in FIG. 1 or in a state of being drawn out from the base tray 41 as illustrated in FIG. 3.

The second expansion tray 43 is held by the first expansion tray 42 and can be in a state of being accommodated in the first expansion tray 42 as illustrated in FIG. 1 or in a state of being drawn out from the first expansion tray 42 as illustrated in FIG. 3.

The third expansion tray 44 is provided so as to be rotatable with respect to the second expansion tray 43 about a rotation shaft (not illustrated) positioned downstream of the second expansion tray 43 and can be in a folded state as illustrated in FIG. 3 or in an upright state (not illustrated). That is, in the upright state, the third expansion tray 44 functions as a stopper that suppresses the discharged document P from being discharged beyond the third expansion tray 44.

Next, the pressing member 30 that presses the document P discharged by the discharge roller pair 17 against the document receiving tray 40 will be described.

Figure 6:
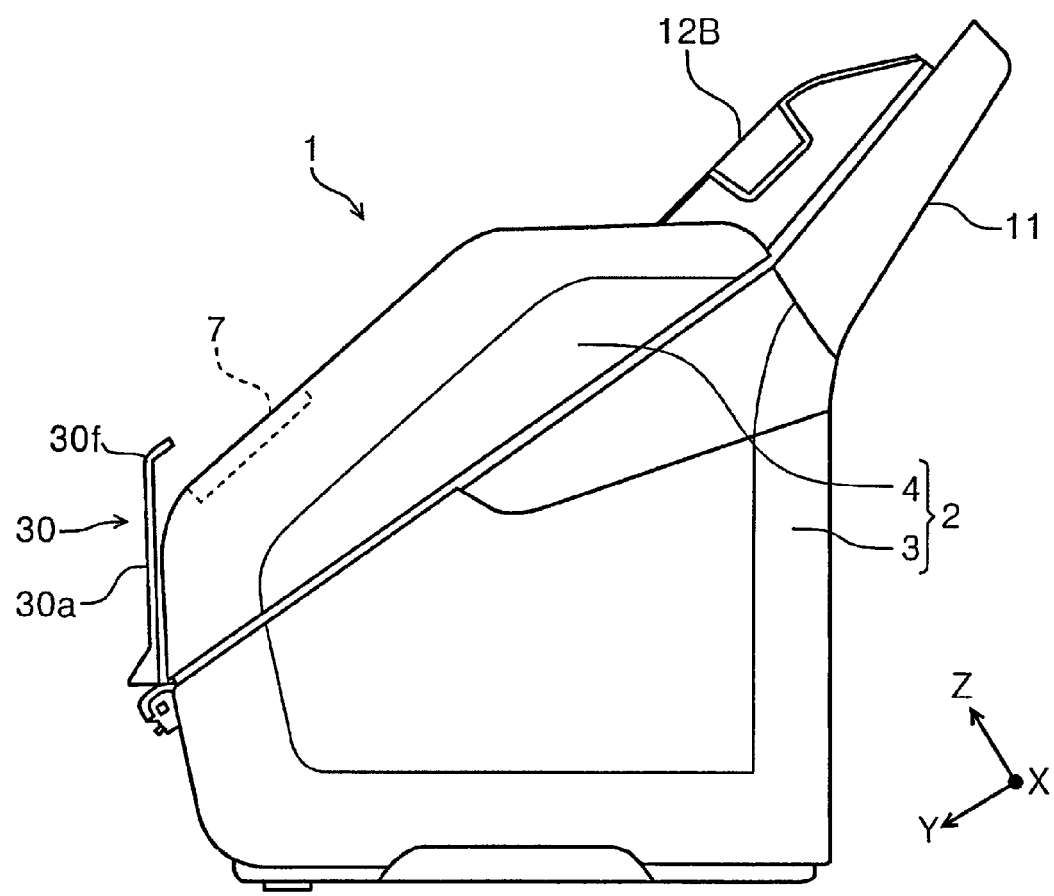
FIG. 6 is a side view of the scanner.
Figure 7:
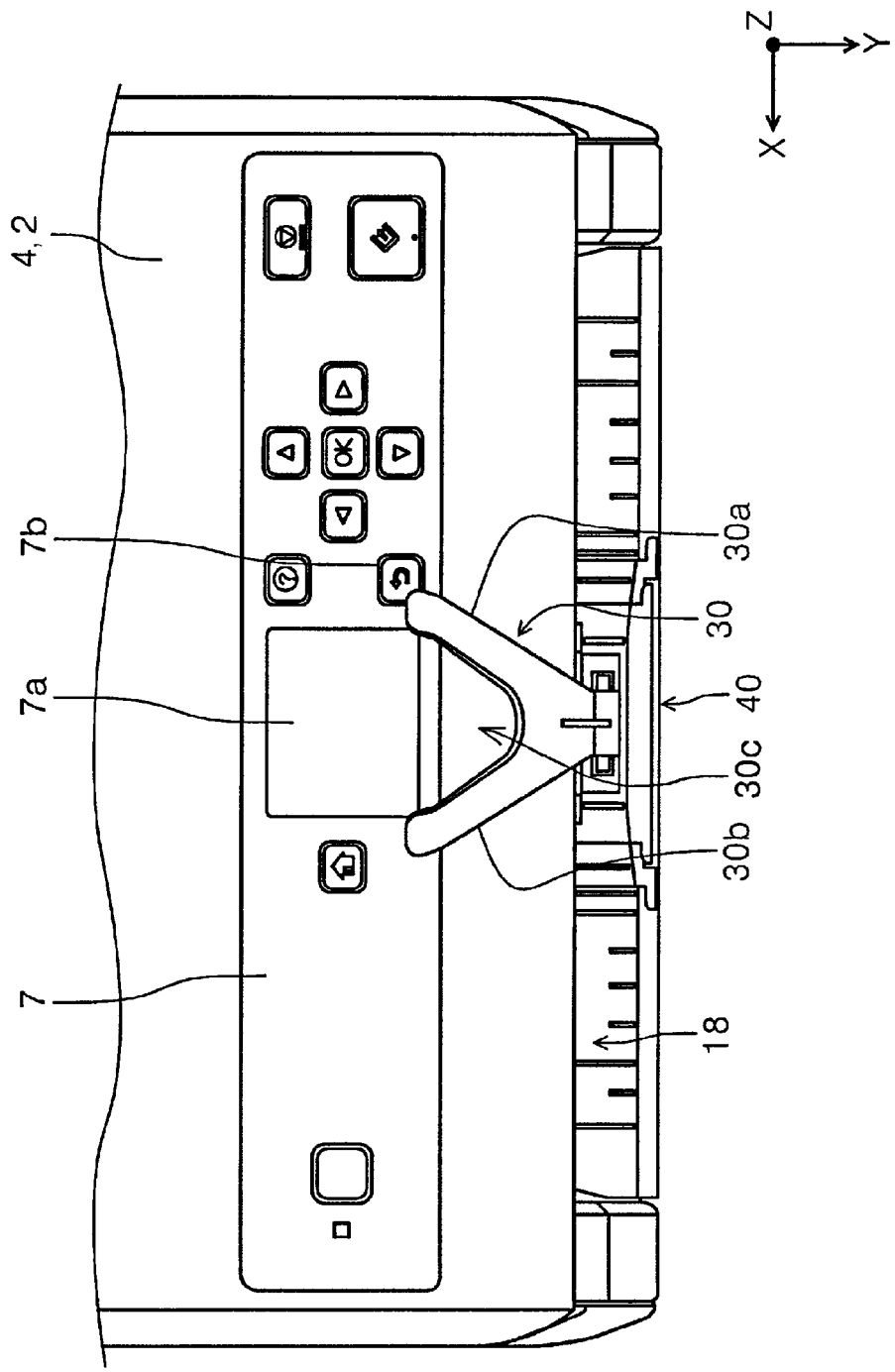
FIG. 7 is a planer view of an operation panel.
Figure 8:
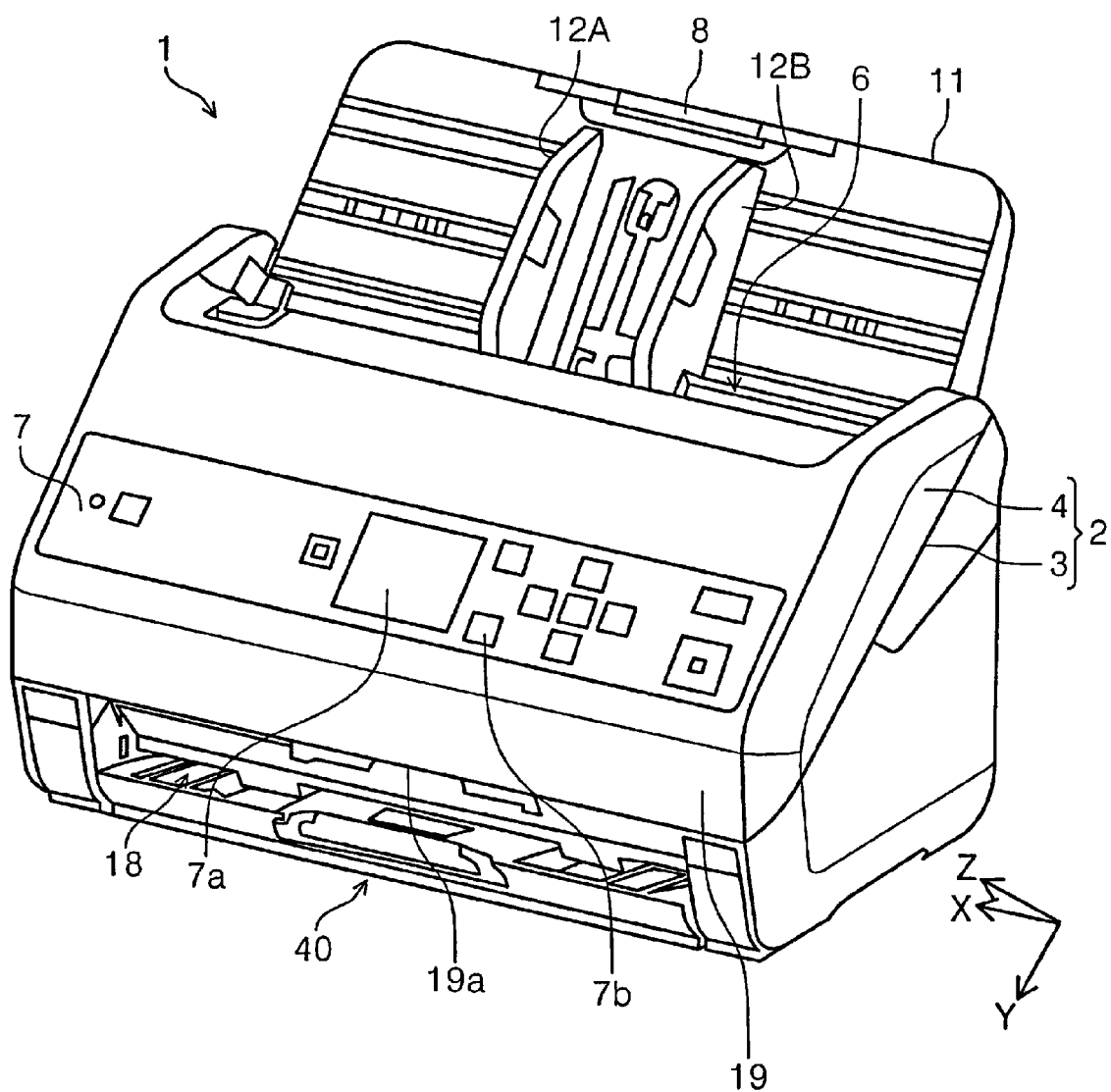
FIG. 8 is a perspective view of the exterior of the scanner.

The pressing member 30 is provided in the upper unit 4 constituting the device main body 2 such that the pressing member 30 is detachably attached to the upper unit 4. Among FIGS. 1 to 8, FIGS. 1 to 7 illustrate a state in which the pressing member 30 is attached to the upper unit 4, and FIG. 8 illustrates a state in which the pressing member 30 is detached from the upper unit 4.

Figure 9:
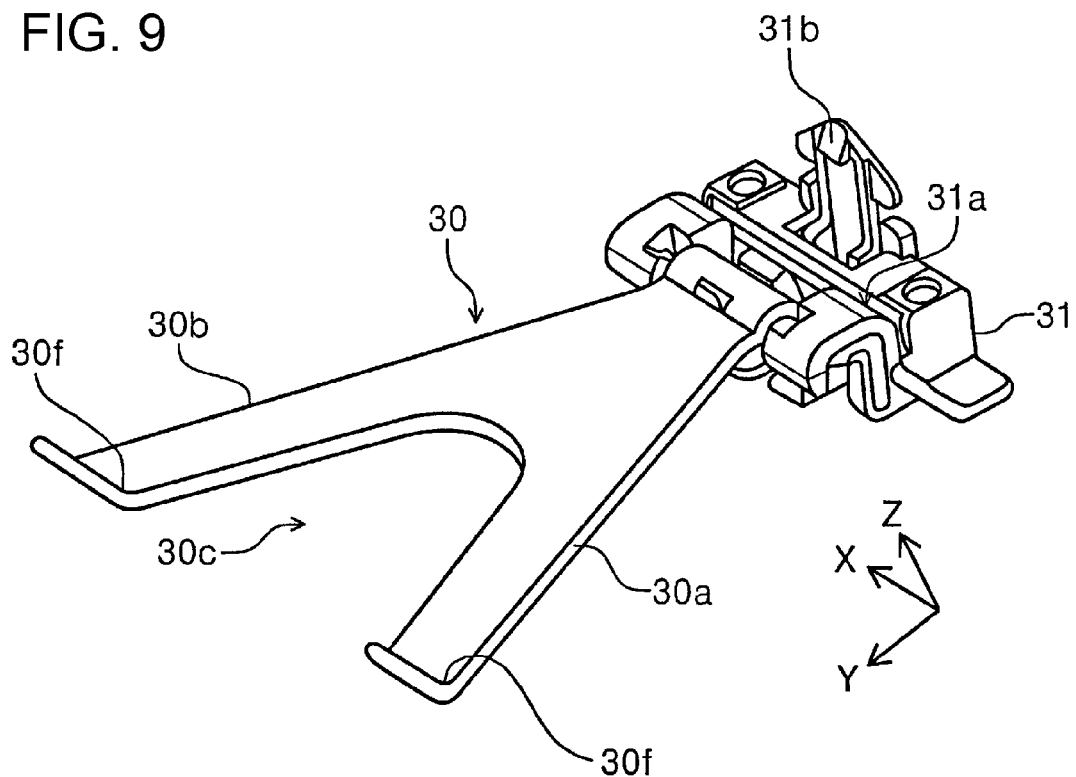
FIG. 9 is a perspective view of the pressing member and a pedestal section.

As illustrated in FIG. 9, the pressing member 30 is provided so as to be rotatable with respect to a pedestal section 31 about a rotation shaft 30d (refer to FIGS. 11A and 11B and 12A to 12C). When the pressing member 30 is attached to the device main body 2, the axis of the rotation shaft 30d is parallel to the X-axis direction, and the pressing member 30 is thereby rotatable in a Y-Z plane in the state of being attached to the device main body 2.

The pedestal section 31 includes a recess 31a and a lock section 31b. The pressing member 30 is detachably attached to the device main body 2 via the pedestal section 31. The pedestal section 31 is suitably formed of, for example, a resin material so as to have elasticity to some extent. The pressing member 30 may be formed of a resin material or a metal material.

In a housing 19 that constitutes the upper surface of the upper unit 4, a fixation section 32 is provided above the discharge opening 18 as illustrated in FIGS. 11A and 11B. The pedestal section 31 described above is attached to the fixation section 32. When the pedestal section 31 is attached to the fixation section 32, an edge section 19a constituting the upper edge of the discharge opening 18 in the housing 19 protrudes into the recess 31a of the pedestal section 31, the lock section 31b constituting the pedestal section 31 and having a hook shape is hooked at the upper edge of the fixation section 32, and the pedestal section 31 is thereby fixed to the fixation section 32.

Figure 10:
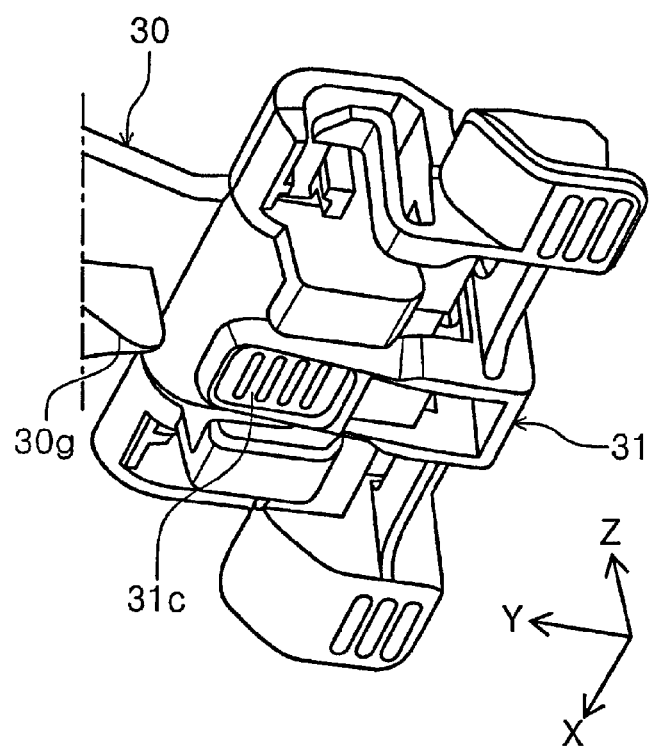
FIG. 10 is a perspective view of the pedestal section.

As illustrated in FIG. 10, an operation section 31c is provided on the lower side of the pedestal section 31. When the operation section 31c is pushed up from the lower side as indicated by arrow Fa in FIG. 11B, the pedestal section 31 rotates clockwise as per FIGS. 11A and 11B, that is, in a direction in which the lock section 31b disengages the upper edge of the fixation section 32, in a state in which a contact portion of the edge section 19a and the recess 31a is used as a fulcrum. Accordingly, as illustrated by the change from FIG. 11A to FIG. 11B, the lock section 31b disengages the upper edge of the fixation section 32, and the fixation state of the pedestal section 31 is terminated. In this manner, the pedestal section 31 and the pressing member 30 are able to be detached from the device main body 2.

Figure 4:
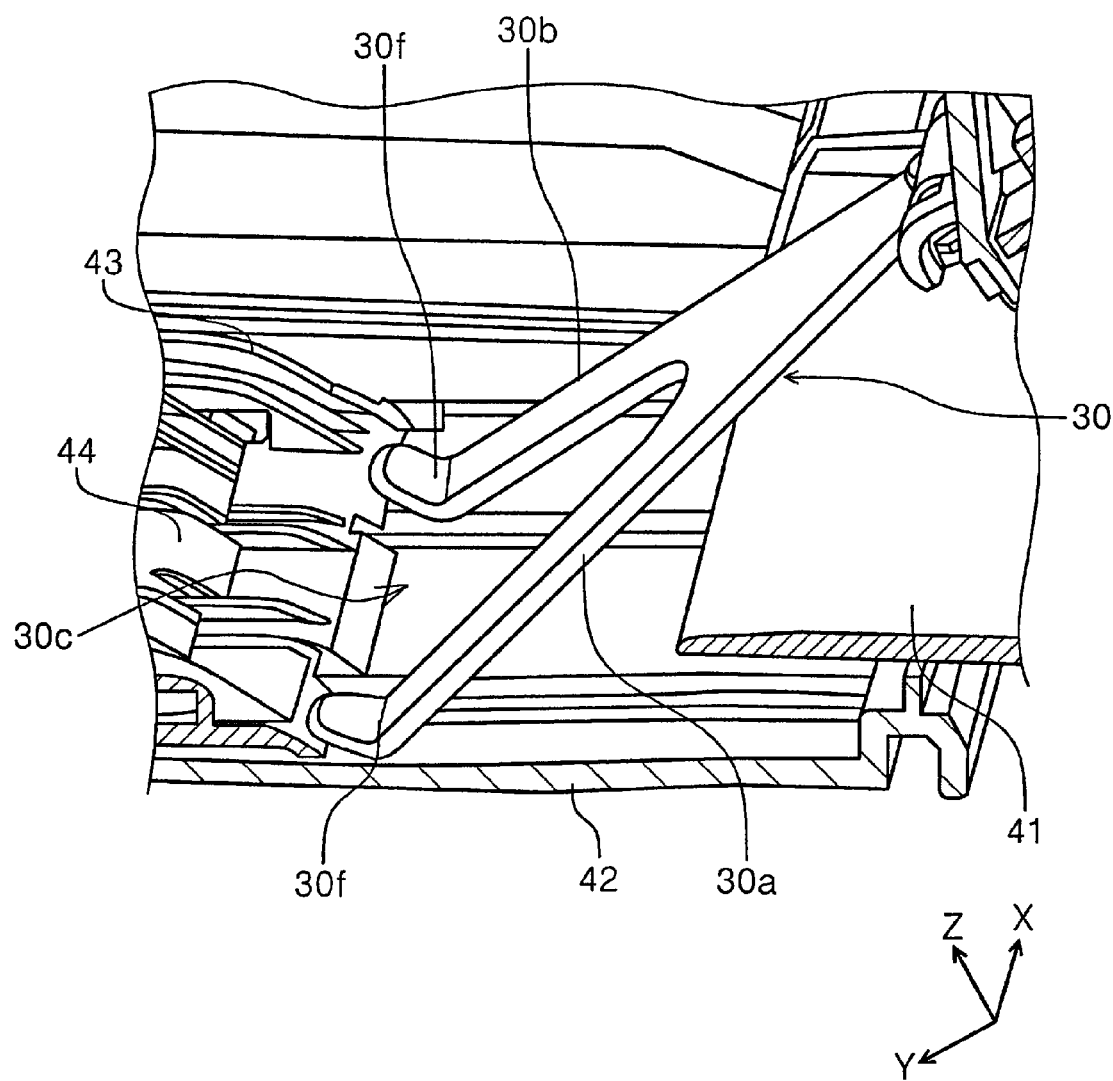
FIG. 4 is a perspective view of the document receiving tray and the pressing member.
Figure 5:
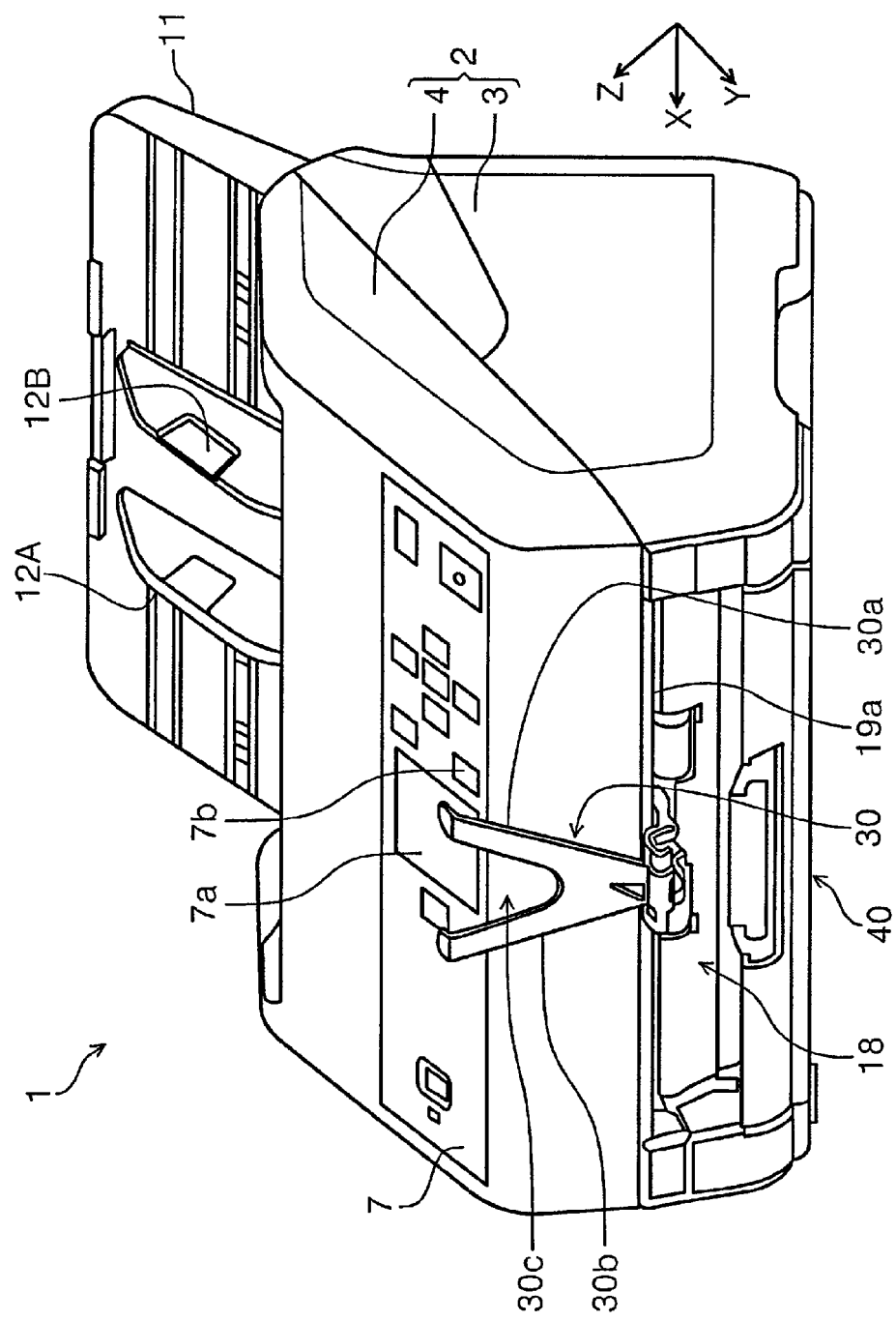
FIG. 5 is a perspective view of the exterior of the scanner.

Next, by rotating, the pressing member 30 is able to switch between a first state which enables the pressing member 30 to come into contact with the discharged document P and a second state in which the pressing member 30 retreats upward to a position at which the pressing member 30 does not come into contact with the discharged document P. Among FIGS. 1 to 7, FIGS. 1 to 4 illustrate an example of the first state of the pressing member 30, and FIGS. 5 to 7 illustrate the second state of the pressing member 30.

Here, as illustrated in FIGS. 12A to 12C, a load applying section 31d serving as a load applying unit is formed in the pedestal section 31. A protrusion 30h is formed on the periphery of the rotation shaft 30d of the pressing member 30 and is able to engage the load applying section 31d. With such a configuration, when the pressing member 30 is in the second state, the pressing member 30 is kept in the second state as illustrated in FIG. 12A. When the pressing member 30 switches from the second state to the first state, the protrusion 30h of the pressing member 30 pushes aside the load applying section 31d. Thus, as illustrated by the change from FIG. 12A to FIG. 12B, the pressing member 30 is able to switch to the first state. As described above, the load applying section 31d applies a load to the pressing member 30 in the operation of switching from the second state to the first state.

Next, as illustrated in FIGS. 3 and 9, the pressing member 30 expands, in the downstream discharging direction of the document P, in the X-axis direction, that is, the width direction, and has a shape in which a center section 30c in the width direction is cut out. Thereby, the state is such that a first arm section 30a is formed in the −X direction of the center section 30c and such that a second arm section 30b is formed in the +X direction of the center section 30c.

With such a configuration, the pressing member 30 comes into contact with the document P at a plurality of contact positions in the width direction and, more specifically, comes into contact with the document P at two contact positions in the present embodiment.

Moreover, a center position in the width direction of the discharged document P is indicated by the one-dot chain line C in FIG. 3, and the center position C is between the two contact positions, that is, between the first arm section 30a and the second arm section 30b, more specifically, in the center of the two contact positions.

Next, a rotating operation of the pressing member 30 will be described. When no document P is present on the document receiving tray 40, the pressing member 30 in the first state is in contact with the upper surface of the document receiving tray 40 due to the weight of the pressing member 30. When the document P is discharged to the document receiving tray 40 in such a state, the pressing member 30 is pushed upward by the document P. When the document P drops onto the document receiving tray 40, the pressing member 30 moves downward accordingly and stops rotating in the state of being in contact with the upper surface of the document P. Thereafter, the pressing member 30 repeats the upward rotation and the downward rotation each time a document P is discharged. In addition, in accordance with an increase in the amount of documents P that accumulate on the document receiving tray 40, a position at which the pressing member 30 stops rotating moves upward. The above-described rotating operation of the pressing member 30 is performed when the pressing member 30 is in the first state.

As described above, the document discharging device 10 includes the pressing member 30 that is detachably attached to the device main body 2 and presses the document P discharged by the discharge roller pair 17 against the document receiving tray 40 in the state in which the pressing member 30 is attached to the device main body 2. When no pressing member 30 is provided, the document P discharged by the discharge roller pair 17 is likely to rotate, that is, skew, in response to a discharging force, after being discharged. However, when the pressing member 30 is provided as described above, since the pressing member 30 presses the discharged document P against the document receiving tray 40, it is possible to suppress the document P from skewing and to improve alignment performance of the document P on the document receiving tray 40. Note that, although the rotation, that is, skewing, of the document P is able to be suppressed by providing a side fence that controls a side edge of the document P to be discharged, for example, when documents P having different sizes are mixed, the side fence is not able to guide a small document, and thus the pressing member 30 is effective.

Moreover, since the pressing member 30 is able to be detached from the device main body 2, it is possible to avoid breakage of the pressing member 30 by detaching the pressing member 30 during storage or transportation of the device.

Furthermore, in the state of being attached to the device main body 2, the pressing member 30 is able to switch between the first state which enables the pressing member 30 to come into contact with the document P discharged by the discharge roller pair 17 and the second state in which the pressing member 30 retreats upward to a position at which the pressing member 30 does not come into contact with the document P discharged by the discharge roller pair 17. Accordingly, when the pressing member 30 is not necessary in a typical use environment, the pressing member 30 may be brought into the second state without being detached from the device main body 2, and it is thereby possible to meet user demand, thus making it possible to enhance user convenience. For example, when jamming is handled, it is possible to achieve a state in which the pressing member 30 is placed aside, by switching the pressing member 30 to the second state.

Note that, in the present embodiment, when no document P is present on the document receiving tray 40, the pressing member 30 is in contact with the upper surface of the document receiving tray 40, but the configuration may be such that, when no document P is present on the document receiving tray 40, the pressing member 30 is apart from the document receiving tray 40 to some extent.

Moreover, the document discharging device 10 includes the load applying section 31*d* that applies a load to the pressing member 30 in the operation of switching from the second state to the first state as described with reference to FIGS. 12A and 12B. It is thereby possible to suppress the pressing member 30 from switching from the second state to the first state against an intention of a user, thus making it possible to further enhance user convenience.

Moreover, at least two contact portions at the pressing member 30 in the first state come into contact with the document P in the width direction which is a direction intersecting the discharging direction of the document P. It is thereby possible to suppress rotation, that is, skewing, of the discharged document P in the X-Y plane.

Moreover, two contact portions at the pressing member 30 come into contact with the document P in the width direction, more specifically, at the first arm section 30*a* and the second arm section 30*b*, and the center position C in the width direction of the document P discharged by the discharge roller pair 17 is between the two contact portions, that is, between the first arm section 30*a* and the second arm section 30*b*. With such a configuration, it is possible to more effectively suppress rotation, that is, skewing, of the discharged document P.

Hereinafter, features of the present embodiment will be further described.

The pressing member 30 expands, in the downstream discharging direction of the document P, in the width direction and has the shape in which the center section 30*c* in the width direction is cut out. With such a shape, by pressing the document P in a region which is wide in the width direction, it is possible to effectively suppress rotation, that is, skewing, of the discharged document P. Since the pressing member 30 has the shape in which the center section 30*c* in the width direction is cut out, it is possible to suppress an increase in weight of the pressing member 30, thus making it possible to suppress deforming at a time of discharging a document P having low rigidity.

In addition, it is possible to reduce an area of the device main body 2 which is covered by the pressing member 30 when the pressing member 30 switches to the second state and to suppress a degradation in operability of the device main body 2. This will be further described below.

As illustrated in FIGS. 5, 6, and 7, the upper edge of the pressing member 30 in the second state is located at a height at which the upper edge overlaps a portion of the operation panel 7 in a height direction. Moreover, as illustrated in FIG. 7, in planer view of the display section 7*a*, the pressing member 30 covers a portion of the operation panel 7 and, in particular, covers both lower corners of the display section 7*a* and a portion of the operation button 7*b*. In the present embodiment, the operation button 7*b* is a return button for returning a state of an operation setting to the previous state.

When the pressing member 30 is in the second state in this manner, although the pressing member 30 covers a portion of the operation panel 7, since the pressing member 30 has the shape in which the center section 30*c* in the width direction is cut out, the pressing member 30 does not cover the display section 7*a* in a wide region, thus making it possible to suppress a degradation in operability.

Moreover, in the present embodiment, in planer view of the display section 7*a*, the pressing member 30 in the second state is located at a position at which the pressing member 30 covers a portion of the display section 7*a* so as not to obstruct viewing of display content on the display section 7*a*. The display content here is characters, images, or the like displayed on the display section 7*a* for a user. Since the pressing member 30 in the second state is located at the position at which viewing of the characters, images, or the like displayed on the display section 7*a* is not obstructed, it is possible to suppress the pressing member 30 from obstructing viewing of the display section 7*a* by a user.

Moreover, although the pressing member 30 covers a portion of the operation button 7*b*, the pressing member 30 is located at a position at which the pressing member 30 exposes a portion of the operation button 7*b*, and an area sufficient for the operation button 7*b* to be pressed is ensured, resulting in the operation button 7*b* being in a state of being able to be pressed. Accordingly, it is possible to avoid a situation in which the pressing member 30 prevents a user from pressing the operation button 7*b*.

Particularly, in the present embodiment, since the pressing member 30 covers a portion of the operation button 7*b* which is the return button for returning the state of the operation setting to the previous state, even when the pressing member 30 covers the entire operation button 7*b*, and the operation button 7*b* is in a state of not being able to be pressed, a basic reading operation of the document P is able to be performed. As an operation button not to be covered by the pressing member 30, a power button, a scan button, or the like is suitable.

Moreover, also when the display section 7*a* is a touch panel, and a user interface by which various setting operations are performed is realized by the display section 7*a*, a configuration in which the pressing member 30 does not cover a touch region for performing the basic reading operation of the document P, or covers only a portion of the touch region, and in which a touch operation is able to be performed is similarly suitable. Alternatively, the user interface for performing various setting operations is suitably realized in a region other than the region covered by the pressing member 30.

Note that the upper edge of the pressing member 30 in the second state is suitably located at a height at which the upper edge does not overlap any portion of the operation panel 7 in the height direction. This is because the pressing member 30 does not obstruct viewing of the display section 7*a* or operation of a plurality of operation buttons.

Moreover, even when the upper edge of the pressing member 30 in the second state is located at a position at which the upper edge overlaps a portion of the operation panel 7 in the height direction, by forming the pressing member 30 by using, for example, a transparent material, it is possible to ensure visibility for a user.

Figure 13:
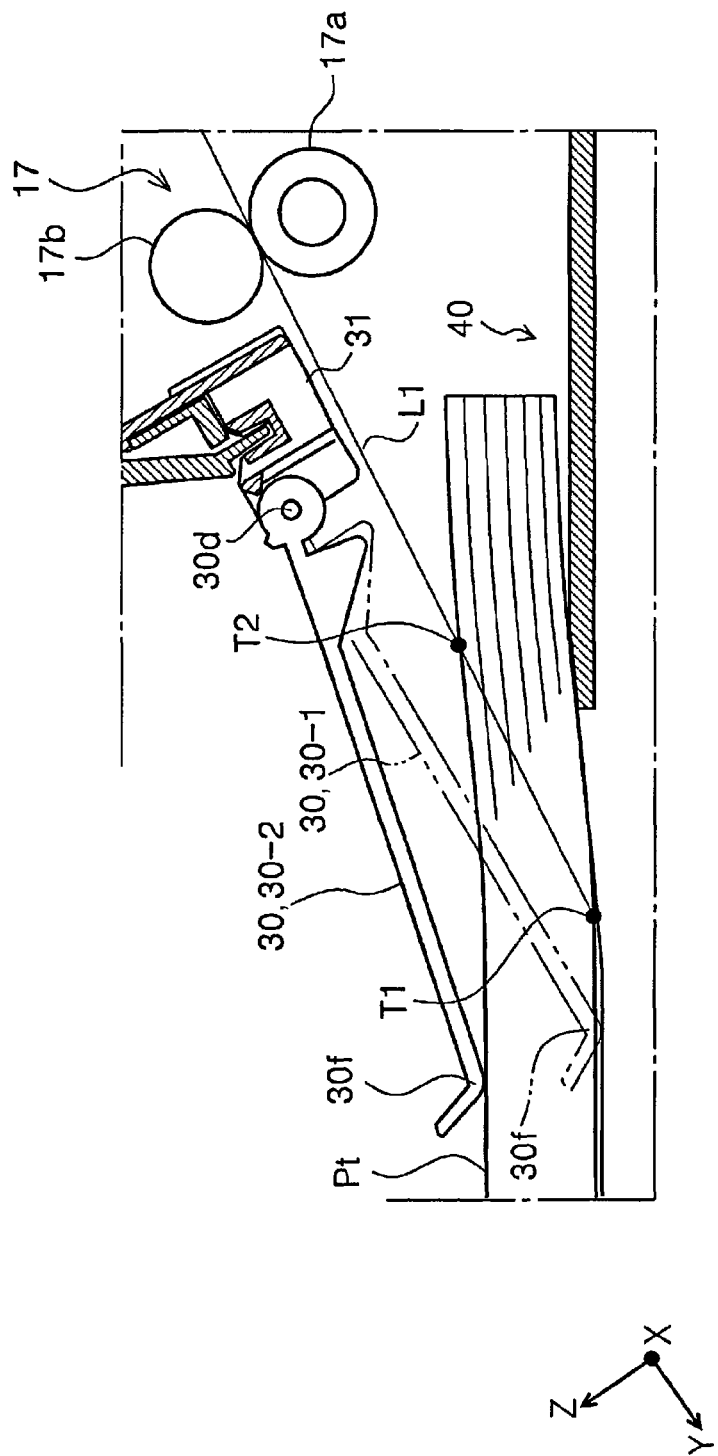
FIG. 13 is a side view of the pressing member.

In FIG. 13, straight line L1 is a common tangent of the discharge drive roller 17*a* and the discharge driven roller 17*b*; that is, line L1 indicates the document discharging direction of the discharge roller pair 17. Moreover, reference numeral 30-1 indicates the pressing member 30 which is in contact with the document receiving tray 40 when no document P is present on the document receiving tray 40. Reference numeral 30-2 indicates the pressing member 30 which is in contact with an uppermost document Pt in a state in which documents P are loaded on the document receiving tray 40 to the maximum loading height. Further, a position T1 is a position at which the document P discharged by the discharge roller pair 17 comes into contact with the document receiving tray 40, and a position T2 is a position at which the document P discharged by the discharge roller pair 17 comes into contact with the uppermost document Pt. Note that the position T2 varies on the common tangent L1 in accordance with a document loading amount.

As illustrated in FIG. 13, the common tangent L1 does not intersect the pressing member 30 regardless of the loading amount of the document P. That is, regardless of the loading amount of the document P, a contact position at which the document P discharged by the discharge roller pair 17 comes into contact with the pressing member 30 is further downstream in the discharging direction than the position T1 at which the document P discharged by the discharge roller pair 17 comes into contact with the document receiving tray 40 or the position T2 at which the document P comes into contact with the uppermost document Pt among the documents P loaded on the document receiving tray 40.

Thereby, the following effect is obtained. When the document P discharged by the discharge roller pair 17 comes into contact with the pressing member 30 before coming into contact with the document receiving tray 40, there is a possibility of the document P deforming and causing a jam. Similarly, when the discharged document P comes into contact with the pressing member 30 before coming into contact with the uppermost document Pt among the documents P loaded on the document receiving tray 40, there is a possibility of the document P deforming and causing a jam. However, according to the present aspect, the contact position at which the document P discharged by the discharge roller pair 17 comes into contact with the pressing member 30 is further downstream in the discharging direction than the position T1 at which the document P discharged by the discharge roller pair 17 comes into contact with the document receiving tray 40 or the position T2 at which the document P comes into contact with the uppermost document Pt among the documents P loaded on the document receiving tray 40. Thus, it is possible to suppress jamming, as described above, from occurring.

Next, as illustrated in FIG. 13, the pressing member 30 has a shape in which a portion 30f in contact with the document receiving tray 40 protrudes toward the document receiving tray 40 when viewed in the width direction intersecting the discharging direction of the document P. Hereinafter, the portion 30f at which the pressing member 30 is in contact with the document receiving tray 40 is referred to as "tray contact portion 30f".

In the present embodiment, the tray contact portion 30f is V-shaped and protrudes toward the document receiving tray 40. Thereby, the following effect is obtained. When the document receiving tray 40 is brought into a contracted state from an expanded state which is illustrated in FIGS. 3 and 4, there is a possibility of the second expansion tray 43 or the third expansion tray 44 being caught by the pressing member 30. However, since the pressing member 30 has the shape in which the tray contact portion 30f protrudes toward the document receiving tray 40, it is possible to suppress the second expansion tray 43 or the third expansion tray 44 from being caught.

Note that, although the tray contact portion 30f is V-shaped in the present embodiment, the shape is not limited thereto and may be another shape such as a U-shape.

Next, FIG. 12C illustrates a state in which the pressing member 30 is positioned at a lower-rotation limit. The lower-rotation limit of the pressing member 30 is regulated when an abutting section 30g formed in the pressing member 30 abuts the operation section 31c which is formed in the pedestal section 31 and which is serves as a regulating section. This state is realized, for example, when the device main body 2 is lifted for moving. In this case, there is a possibility that, when the device main body 2 is placed on an installation surface, the pressing member 30 comes into contact with the installation surface of the device and is subjected to an upward external force Fc, resulting in breakage. However, when the external force Fc including a vertically upward component is applied to a lower edge of the pressing member 30 positioned at the lower-rotation limit, as is clear from FIGS. 12A to 12C, the pressing member 30 rotates to be in the second state. Thereby, it is possible to suppress breakage of the pressing member 30 as described above.

Moreover, the lower-rotation limit of the pressing member 30 is regulated when the abutting section 30g abuts the operation section 31c serving as the regulating section. In a state in which the abutting section 30g abuts the operation section 31c, the orientation of the pressing member 30 is inclined obliquely downward as illustrated in FIG. 12C. Thereby, when the external force Fc including the vertically upward component acts on the lower edge of the pressing member 30 positioned at the lower-rotation limit, the pressing member 30 is able to reliably rotate to be in the second state, and it is possible to reliably suppress breakage of the pressing member 30 as described above.

Moreover, also when an external force Fd which causes the pressing member 30 to rotate in a direction opposite to the direction in which the pressing member 30 is brought into the second state is applied to the pressing member 30 positioned at the lower-rotation limit, there is a possibility of causing breakage of the pressing member 30. However, when the external force Fd described above is applied, the abutting section 30g which is a portion of the pressing member 30 abuts the operation section 31c and applies an external force indicated by arrow Fb to the operation section 31c. Since the fixation of the pressing member 30 which is performed by the lock section 31b is thereby terminated as described with reference to FIGS. 11A and 11B, the pressing member 30 is able to detach and drop, thus making it possible to suppress breakage of the pressing member 30.

Figure 14:
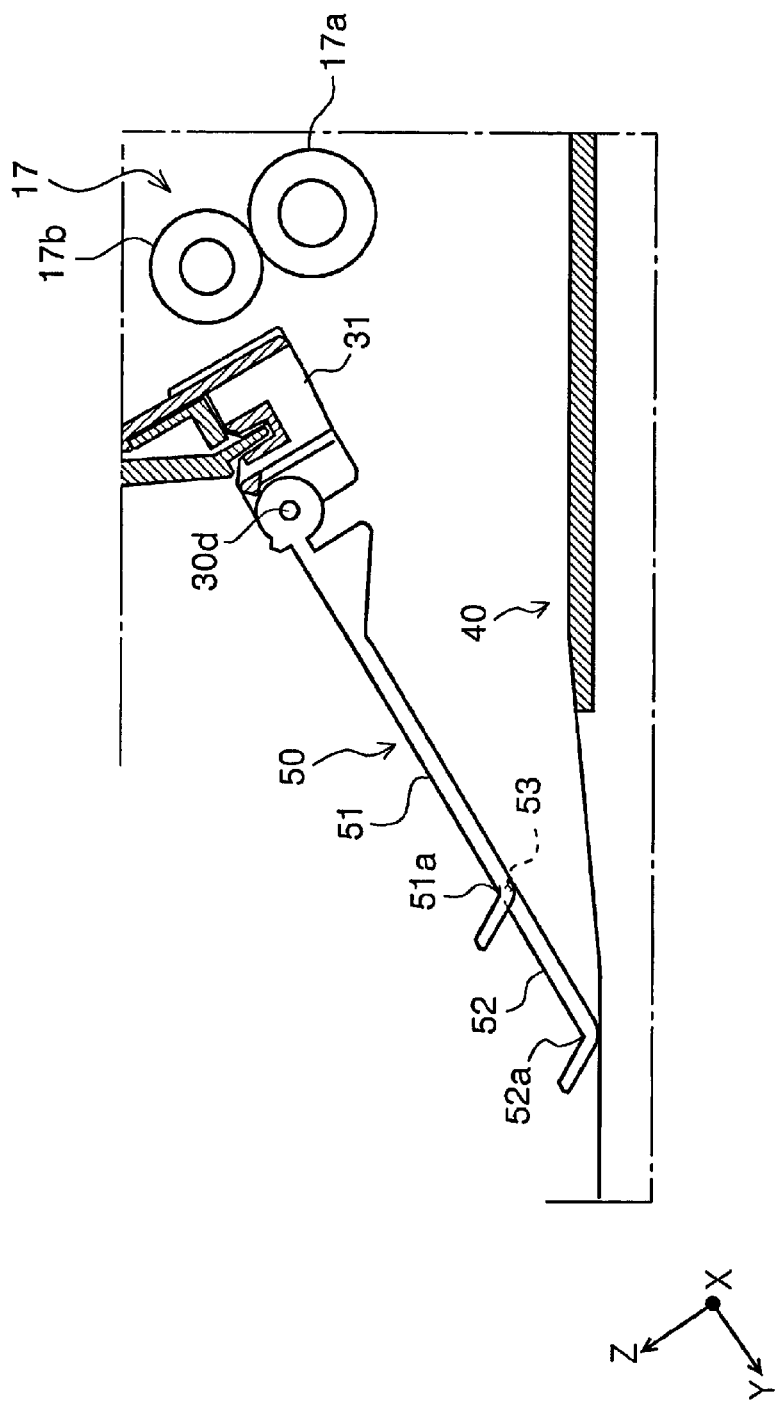
FIG. 14 is a side view of a pressing member according to a second embodiment.
Figure 15:
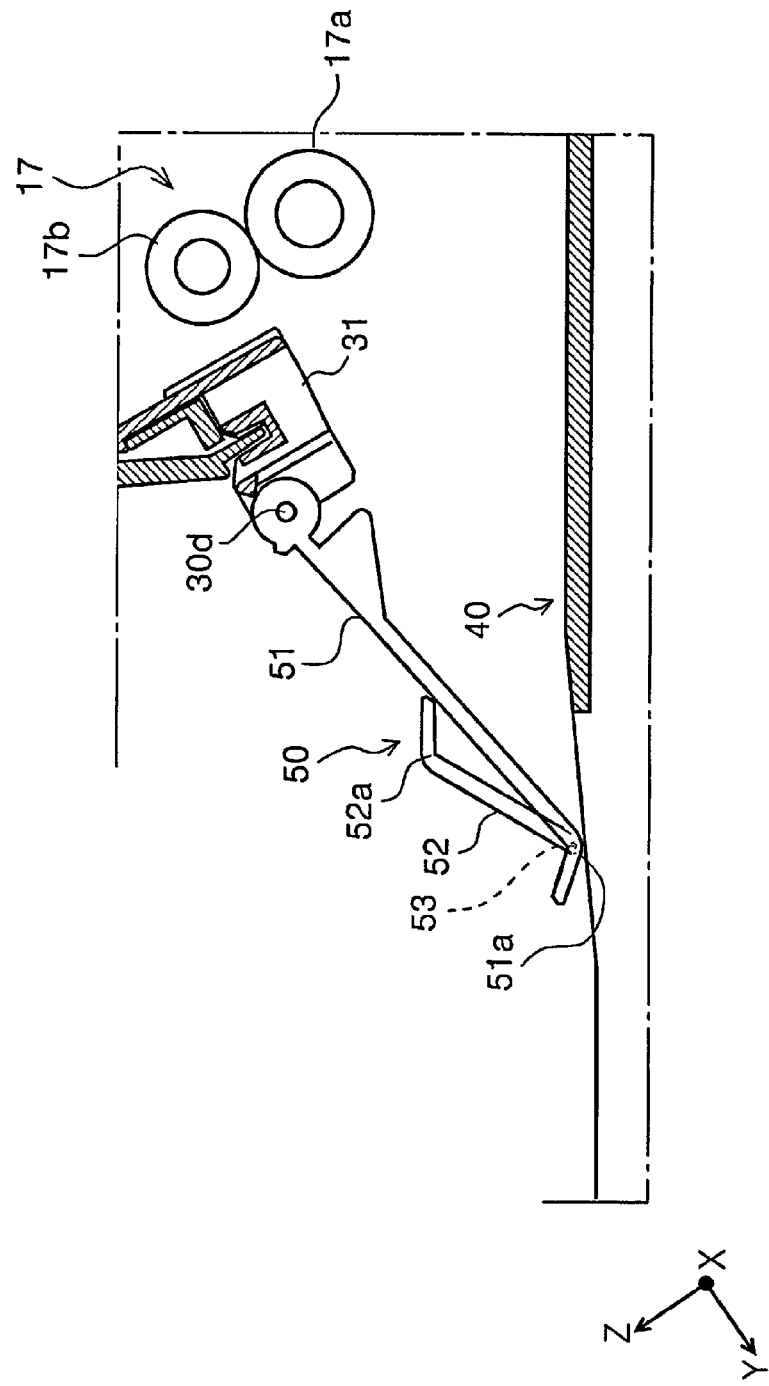
FIG. 15 is a side view of the pressing member according to the second embodiment.

Subsequently, other embodiments of the pressing member will be described. FIGS. 14 and 15 illustrate a pressing member 50 according to a second embodiment. Note that, in the following embodiments, a constituent the same as the constituent which has already been described will be given the same reference numeral, and redundant description will be omitted.

The pressing member 50 includes a first arm 51 and a second arm 52. The first arm 51 is rotatable about the rotation shaft 30d, and the second arm 52 is coupled so as to be rotatable with respect to the first arm 51 via a rotation shaft 53 having an axis parallel to the width direction. Moreover, a friction member (not illustrated) is provided in the rotation shaft 53, and the configuration is such that a frictional force is applied to rotation of the second arm 52 with respect to the first arm 51. Accordingly, the second arm 52 is in a state in which rotation thereof is regulated by the frictional force, except for rotation when an external force is applied by a user.

A tray contact portion 51a which protrudes toward the document receiving tray 40 is formed in the first arm 51, and a tray contact portion 52a which protrudes toward the document receiving tray 40 is formed similarly in the second arm 52. As illustrated in FIG. 14, when the first arm 51 and the second arm 52 are aligned with each other, the pressing member 50 is, as a whole, in the longest state in the document discharging direction. In this state, the tray contact portion 52a of the second arm 52 is in contact with the document receiving tray 40 or in contact with the discharged document P.

Moreover, when the second arm 52 is rotated clockwise in FIG. 14 from the state illustrated in FIG. 14 to be brought into the state illustrated in FIG. 15, the pressing member 50 is, as a whole, in the shortest state in the document discharging direction. In this state, the tray contact portion 51*a* of the first arm 51 is in contact with the document receiving tray 40 or in contact with the discharged document P.

As described above, since the configuration is such that the dimension of the pressing member 50 in the discharging direction of the document P is able to be adjusted, it is possible to adjust, in accordance with the size of the document P, a position at which the pressing member 50 presses the document P, thus making it possible to appropriately press the document P.

Note that, in the present embodiment, although the configuration is such that the two members of the first arm 51 and the second arm 52 are used for adjusting the dimension of the pressing member 50 in the discharging direction of the document P, the configuration may be such that the pressing member 50 has a configuration of three or more members to adjust the dimension in the discharging direction in a stepwise manner.

Alternatively, for example, the configuration may be such that the second arm 52 is provided so as to be slidable in the discharging direction with respect to the first arm 51 to adjust the dimension in the discharging direction in a stepless manner.

Figure 16:
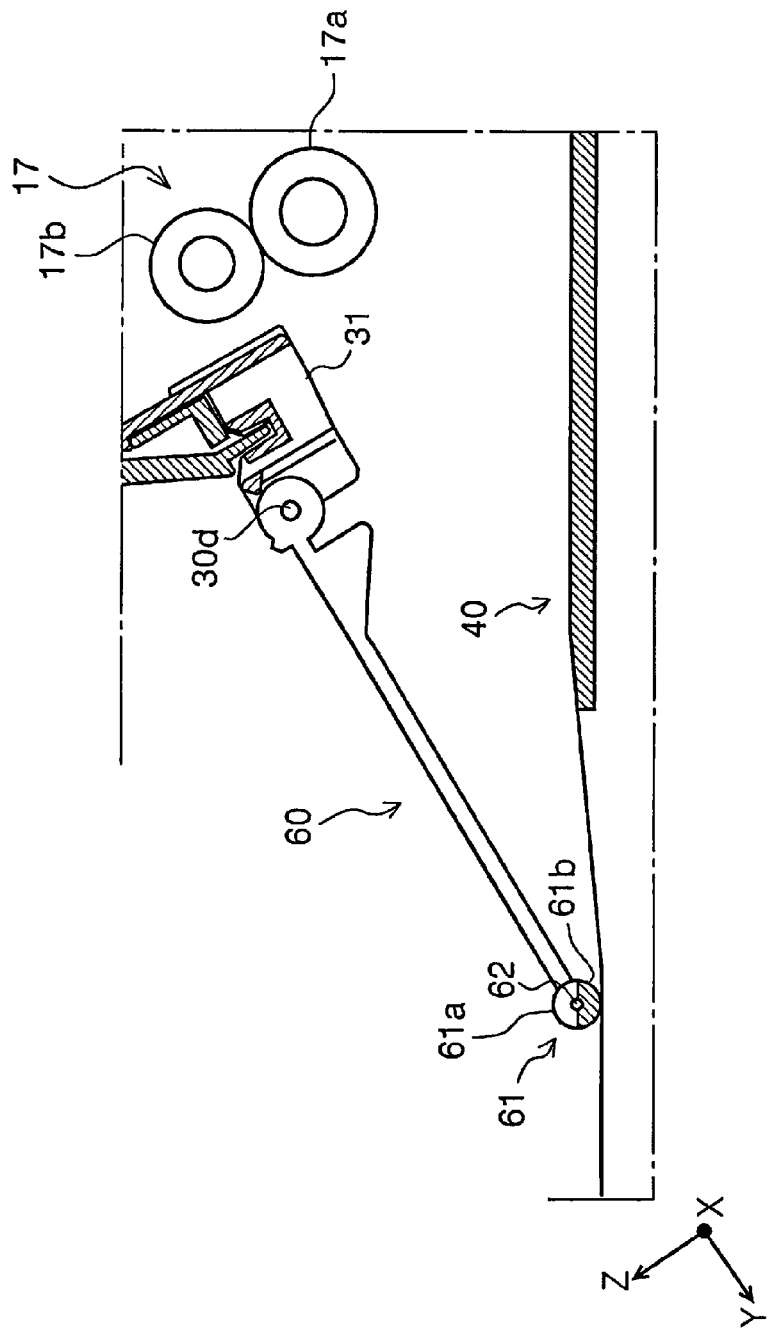
FIG. 16 is a side view of a pressing member according to a third embodiment.

Next, FIG. 16 illustrates a pressing member 60 according to a third embodiment. In the pressing member 60, a contact portion 61 which comes into contact with the document P includes a first portion 61*a* in which a frictional coefficient between the first portion 61*a* and the document P is a first frictional coefficient and a second portion 61*b* in which a frictional coefficient between the second portion 61*b* and the document P is a second frictional coefficient which is larger than the first frictional coefficient of the first portion 61*a*. The contact portion 61 is rotatable with respect to the pressing member 60 about a rotation shaft 62, and when the contact portion 61 rotates, a portion which comes into contact with the document P is able to switch between the first portion 61*a* and the second portion 61*b*. Note that a friction member (not illustrated) is provided between the contact portion 61 and the rotational shaft 62, and the contact portion 61 is in a state in which rotation thereof is regulated by the frictional force of the friction member, except for rotation when an external force is applied by a user.

As described above, since the contact portion 61 is able to switch between the first portion 61*a* in which the frictional coefficient between the first portion 61*a* and the document P is the first frictional coefficient and the second portion 61*b* having the second frictional coefficient which is larger than the first frictional coefficient, it is possible to switch the frictional coefficient in accordance with a size, a type, or the like of the document P, thus making it possible to appropriately press the document P.

For example, when the document P has low rigidity and readily deforms, the document P is suitably pressed by the first portion 61*a*, and when the document P has rigidity to some extent and does not readily deform, the document P is suitably pressed by the second portion 61*b*.

Figure 17:
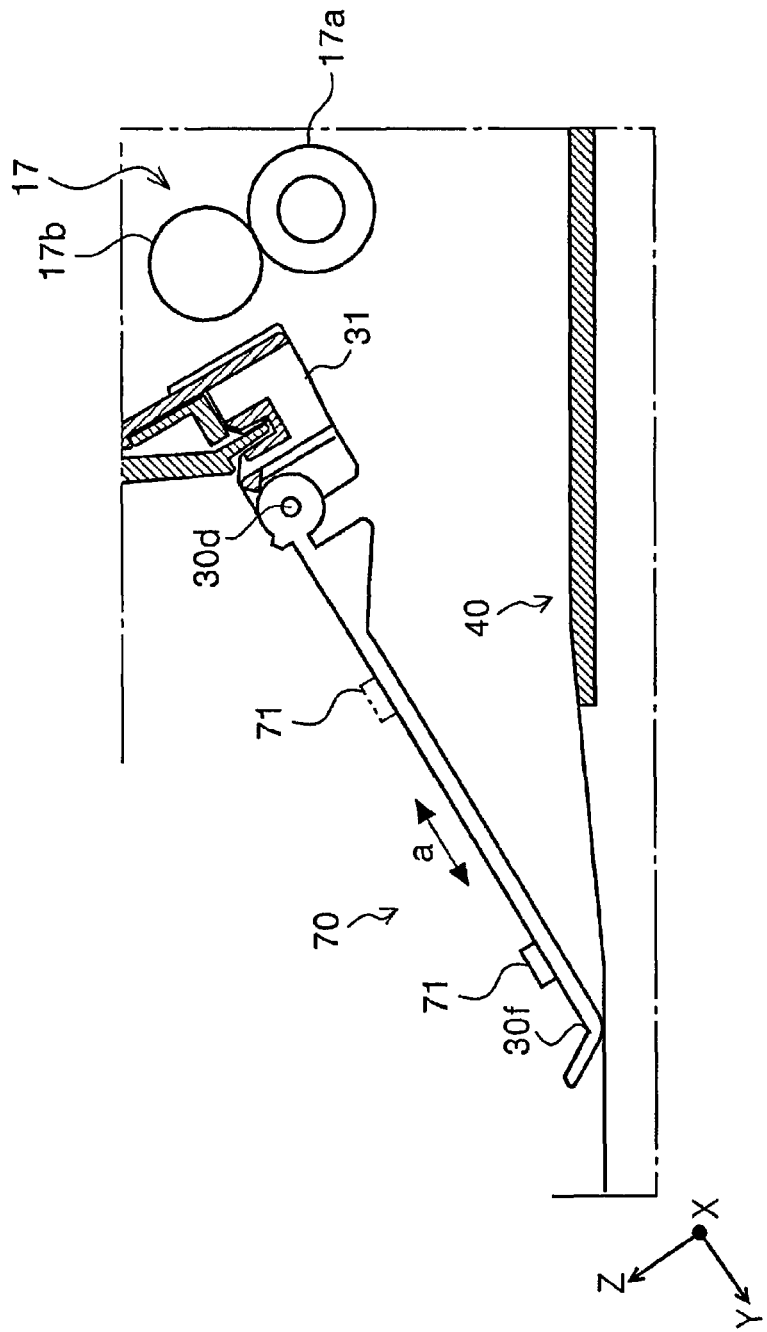
FIG. 17 is a side view of a pressing member according to a fourth embodiment.

Next, FIG. 17 illustrates a pressing member 70 according to a fourth embodiment. On the upper surface of the pressing member 70, a weight 71 is provided so as to be able to move in a direction of arrow a. The weight 71 is provided such that a frictional force is generated between the weight 71 and the pressing member 70 by a friction member (not illustrated). The weight 71 is in a state in which movement thereof is regulated by the frictional force of the friction member, except for movement when an external force is applied by a user. By moving the weight 71, it is possible to adjust a pressing load with which the pressing member 70 presses the document P. With such a configuration, it is possible to adjust the pressing load in accordance with a size, a type, or the like of the document P, thus making it possible to appropriately press the document P.

For example, when the document P has low rigidity and readily deforms, the pressing load is suitably reduced, and when the document P has rigidity to some extent and does not readily deform, the pressing load is suitably increased compared with the pressing load for pressing the document P which has low rigidity and readily deforms.

It is needless to say that the disclosure is not limited to the embodiments described above, that various modifications can be made within the scope of the disclosure described in the claims, and that these modifications are included within the scope of the disclosure.

For example, a detecting unit which detects the first state or the second state of the pressing member 30 may be provided and when the pressing member 30 is in the first state, a document discharge speed may be reduced compared with the document discharge speed in the second state.

Moreover, for example, although the medium-discharging device is configured as the document discharging device 10 of the scanner 1 in the present embodiment, there is no limitation thereto, and the medium-discharging device is applicable also to a recording device, such as a printer, which performs recording on a medium.

What is claimed is:

1. A medium-discharging device comprising:
   a device main body including a medium-discharging section that discharges a medium;
   a medium-receiving tray that receives the medium discharged by the medium-discharging section; and
   a pressing member that is configured to be attached to and detached from the device main body and press the medium discharged by the medium-discharging section against the medium-receiving tray in a state in which the pressing member is attached to the device main body, wherein
   the pressing member is configured to switch, in the state in which the pressing member is attached to the device main body, between a first state in which the pressing member comes into contact with the medium discharged by the medium-discharging section and a second state in which the pressing member retreats upward to a position at which the pressing member does not come into contact with the medium discharged by the medium-discharging section.

2. The medium-discharging device according to claim 1, further comprising:
   a load applying unit that applies a load to the pressing member in an operation of switching from the second state to the first state.

3. The medium-discharging device according to claim 1, wherein
   the pressing member is provided so as to switch between the first state and the second state by rotating, and
   the pressing member rotates to be in the second state, when an external force including a vertically upward component is applied to a tip end of the pressing member positioned at a lower-rotation limit.

4. The medium-discharging device according to claim 3, further comprising:
   an abutting section that is formed at the pressing member; and a regulating section that comes into contact with the abutting section and regulates a rotation of the pressing member, wherein
the pressing member at the lower-rotation limit is regulated and inclined obliquely downward when the abutting section comes into contact with the regulating section.

5. The medium-discharging device according to claim 1, further comprising:
a lock section that fixes the pressing member to the device main body; and
an operation section that is configured to unlock a lock of the lock section, wherein
the pressing member is provided so as to switch between the first state and the second state by rotating, and
when an external force that causes the pressing member to rotate in a direction in which the member rotates from the first state to the second state is applied to the pressing member positioned at the lower-rotation limit, a portion of the pressing member abuts against the operation section and the lock of the lock section is unlocked.

6. The medium-discharging device according to claim 1, wherein
a contact position at which the medium discharged by the medium-discharging section comes into contact with the pressing member in the first state is further downstream in a discharging direction than a position at which the medium discharged by the medium-discharging section comes into contact with the medium-receiving tray.

7. The medium-discharging device according to claim 1, wherein
the pressing member has at least two contact portions that come into contact with the medium in a width direction which is a direction intersecting a medium-discharging direction when the pressing member is in the first state.

8. The medium-discharging device according to claim 1, wherein
the pressing member has two contact portions that come into contact with the medium in a width direction which is a direction intersecting a medium-discharging direction when the pressing member is in the first state, and
a center position in the width direction of the medium discharged by the medium-discharging section is between the two contact portions.

9. The medium-discharging device according to claim 8, wherein
the two contact portions come into contact with the medium at different positions in the width direction, and
the pressing member has a shape in which a center section between the two contact portions in the width direction is cut out.

10. The medium-discharging device according to claim 1, wherein
the pressing member has a protruded portion that comes into contact with the medium-receiving tray and protrudes toward the medium-receiving tray when viewed in a width direction which is a direction intersecting a medium-discharging direction.

11. The medium-discharging device according to claim 1, wherein
the pressing member is configured to adjust a pressing load with which the pressing member presses the medium.

12. The medium-discharging device according to claim 1, wherein
the pressing member is configured to adjust a dimension of the pressing member in a medium-discharging direction.

13. The medium-discharging device according to claim 1, wherein
the pressing member is configured to switch a portion which comes into contact with the medium between a first portion in which a frictional coefficient between the first portion and the medium is a first frictional coefficient and a second portion in which a frictional coefficient between the second portion and the medium is a second frictional coefficient which is larger than the first frictional coefficient.

14. The medium-discharging device according to claim 1, wherein
the device main body includes a display section displaying various types of information, and
the pressing member in the second state is located at a position at which the pressing member covers a portion of the display section so as not to obstruct viewing of display content on the display section in a planer view.

15. The medium-discharging device according to claim 1, wherein
the device main body includes an operation panel that receives various operation settings,
the operation panel includes at least one pressing button configured to be pressed, and
the pressing member in the second state is located at a position at which the pressing member covers a portion of the pressing button and the pressing member exposes a portion of the pressing button in a planer view.

16. An image reading apparatus comprising:
a reading unit that reads the medium; and
the medium-discharging device according to claim 1 which discharges the medium read by the reading unit.

17. An image reading apparatus comprising:
a reading unit that reads a medium;
a medium-discharging device which discharges the medium read by the reading unit comprising;
a device main body that includes a lower unit and an upper unit that is connected with the lower unit and is configured to rotate against the lower unit;
a transport path that is formed between the upper unit and the lower unit for transporting the medium and is inclined obliquely downward;
a medium-discharging section that discharges the medium read by the reading unit;
a medium-receiving tray that receives the medium discharged by the medium-discharging section; and
a pressing member that is configured to be attached to and detached from the upper unit and press the medium discharged by the medium-discharging section against the medium-receiving tray in a state in which the pressing member is attached to the upper unit, wherein
the pressing member is configured to switch, in the state in which the pressing is attached to upper unit, between a first state in which the pressing member comes into contact with the medium discharged by the medium-discharging section and a second state in which the pressing member retreats upward to a position at which the pressing member does not come into contact with the medium discharged by the medium-discharging section.

* * * * *